United States Patent
Stiner

[19]

[11] Patent Number: 6,056,221
[45] Date of Patent: May 2, 2000

[54] FISHING REEL WITH TRIGGER ACTUATED BAIL ASSEMBLY

[75] Inventor: Roy E. Stiner, Tulsa, Okla.

[73] Assignee: Brunswick Corporation, Tulsa, Okla.

[21] Appl. No.: 09/189,684

[22] Filed: Nov. 10, 1998

[51] Int. Cl.[7] .................................................. A01K 89/01
[52] U.S. Cl. .......................................... 242/233; 242/311
[58] Field of Search .................................... 242/233, 310, 242/311

[56] References Cited

U.S. PATENT DOCUMENTS

| | | |
|---|---|---|
| 4,676,450 | 6/1987 | Carpenter . |
| 4,747,559 | 5/1988 | Hitomi ..................................... 242/233 |
| 4,830,306 | 5/1989 | Tsunoda et al. . |
| 4,921,188 | 5/1990 | Smith . |
| 5,098,031 | 3/1992 | Hitomi ..................................... 242/233 |
| 5,143,318 | 9/1992 | Tipton et al. . |
| 5,154,369 | 10/1992 | Smith . |
| 5,301,898 | 4/1994 | Ban et al. ............................... 242/233 |
| 5,342,003 | 8/1994 | Sugawara et al. .................. 242/233 X |
| 5,524,832 | 6/1996 | Sakaguchi ............................. 242/233 |
| 5,595,352 | 1/1997 | Oh ........................................... 242/233 |
| 5,613,645 | 3/1997 | Carpenter et al. . |
| 5,620,149 | 4/1997 | Zurcher et al. . |
| 5,667,159 | 9/1997 | Carpenter et al. ...................... 242/233 |
| 5,669,565 | 9/1997 | Zurcher et al. . |
| 5,797,554 | 8/1998 | Atherton et al. . |
| B1 4,676,450 | 6/1987 | Carpenter et al. . |

Primary Examiner—Donald P. Walsh
Assistant Examiner—William A. Rivera
Attorney, Agent, or Firm—Wood, Phillips, VanSanten, Clark & Mortimer

[57] ABSTRACT

A rotor assembly for a fishing reel, which rotor assembly has a rotor with a first rotational axis and forward and rear ends spaced axially relative to the first axis. The rotor assembly further has a bail assembly that is repositionable relative to the rotor between cast and retrieve positions. The bail assembly has a first arm that is pivotable around a second axis relative to the rotor as the bail assembly moves between the cast and retrieve positions. The rotor assembly further has a trigger that is movable relative to the rotor around a third axis between normal and actuated positions. The bail assembly is movable from the retrieve position towards the cast position as an incident of the trigger moving from the normal position to the actuated position. The third axis is spaced forwardly of the second axis.

27 Claims, 8 Drawing Sheets

FISHING REEL WITH TRIGGER ACTUATED BAIL ASSEMBLY

BACKGROUND OF THE INVENTION

1. Field of the Invention

This invention relates to fishing reels and, more particularly, to a fishing reel having a bail assembly that is selectively movable from a retrieve position into a cast position through the operation of a trigger.

2. Background Art

One well known fishing reel construction utilizes a rotor with a bail assembly thereon. The bail assembly is repositionable between a cast position and a retrieve position. In the retrieve position for the bail assembly, rotation of the rotor causes the bail assembly to wrap line around a line carrying spool. By repositioning the bail assembly from the retrieve position into the cast position, line can pay freely off of the spool.

Several variations of this type of reel exist which permit repositioning of the bail assembly in different manners. In the simplest form for this system, the user is required to manually grasp, and effect pivoting of, the bail assembly to move the bail assembly from the retrieve position into the cast position.

To avoid having to directly engage the bail assembly, triggers have been incorporated into certain of these reels. In one form, the trigger is mounted on the rotor to follow movement thereof. With this type of trigger, the rotor is repositioned strategically to situate the trigger directly under the rod to allow the user to, with one hand, grasp the fishing rod and reposition the trigger. As the trigger is moved from its normal position to its actuated position, the finger or fingers that actuate the trigger draw the line away from a line roller so that the line is held by the finger/fingers and thereby prevented from paying out as a cast is initiated. The user then thrusts the rod in the desired direction and at the same time releases the line to perform the cast.

In another form, a trigger is mounted to the reel frame so that the rotor rotates relative to the trigger. The assignee herein offers a line of reels of this type which it identifies as its HYPERCAST® fishing reels. The HYPERCAST® fishing reels are designed so that the trigger can reposition the bail assembly regardless of the rotational position of the rotor. The structure of one form of the HYPERCAST® fishing reel is shown in U.S. Pat. No. 5,620,149.

The assignee herein also offers another feature on its reels which obviates the need to have the operator touch the line throughout the performance of a cast. The assignee identifies this feature as its SNAPSHOT® line holding mechanism. Reels with this feature utilize a pivotable arm having a pin at a free end remote from the arm pivot location. Operation of the trigger performs both functions of repositioning the bail assembly and repositioning the pin arm. As the trigger is actuated, the bail assembly moves from the retrieve position into the cast position. Upon full actuation, the pin arm is moved so that the pin free end situates adjacent to a wire on the bail assembly to hold the line and prevent payout thereof. The pin arm is spring biased so that, as the trigger is released, the pin arm repositions to move the pin away from the bail wire to allow line to pay out while the bail assembly remains in the cast position. This feature is shown in U.S. Pat. Nos. 4,921,188 and 5,154,369.

The trigger operated bail assemblies in the SNAPSHOT® line holding mechanisms have been offered successfully by the assignee herein for years. With certain of the reels having rotor mounted triggers, the triggers are mounted for pivoting movement around an axis that crosses a pivot axis for the bail assembly. The trigger cams against the pin arm, which in turns cams the bail assembly from the retrieve position towards the cast position. By reason of the proximity of the cooperating cam surfaces on the trigger and pin arm, the actuating portion of the trigger has been made relatively long to permit actuation of the bail assembly without the application of an uncomfortably large force upon the trigger. At the same time, a relatively large range of movement for the trigger is required to effect the requisite movement of the bail assembly.

With the trigger mounted radially outwardly from a bail arm on the bail assembly, the clearance space between the trigger and the rod, for the user's hand, may be reduced to an undesirable extent. Also, the further the trigger resides from the rotational axis of the rotor, the greater is the angular velocity of the trigger during operation, which produces a centrifugal force tending to pivot the trigger towards its actuated position. While a spring mechanism is incorporated into the reel to normally urge the trigger back to the normal position, over time, the spring force may vary, which may allow the trigger to pivot towards the actuated position. This could cause interference with the user's hand holding the rod and reel.

SUMMARY OF THE INVENTION

The invention is directed to a rotor assembly for a fishing reel, which rotor assembly has a rotor with a first rotational axis and forward and rear ends spaced axially relative to the first axis. The rotor assembly further has a bail assembly that is repositionable relative to the rotor between cast and retrieve positions. The bail assembly has a first arm that is pivotable around a second axis relative to the rotor as the bail assembly moves between the cast and retrieve positions. The rotor assembly further has a trigger that is movable relative to the rotor around a third axis between normal and actuated positions. The bail assembly is movable from the retrieve position towards the cast position as an incident of the trigger moving from the normal position to the actuated position. The third axis is spaced forwardly of the second axis.

In one form, the rotor has a first, substantially flat surface facing radially outwardly relative to the first axis and the first bail arm has a second substantially flat surface directly exposed to and facing the first surface, with the third axis being radially inside the first surface relative to the first axis.

The third axis may be substantially orthogonal to the second axis.

The rotor assembly may further have a pin arm that is movable between first and second positions, with the pin arm causing the bail assembly to move from the retrieve position toward the cast position as the pin arm moves from the first position into the second position. The trigger moves the pin arm from the first position into the second position as the trigger moves from the normal position into the actuated position.

The pin arm may be pivotable about a fourth axis between the first and second positions. The fourth axis may be substantially parallel to the second axis. The fourth axis may be spaced rearwardly from the second axis.

In one form, the trigger has a first elongate leg with a length extending substantially radially with respect to the first axis, a second elongate leg with a length extending substantially circumferentially relative to the rotor, and a third elongate leg with a length extending substantially parallel to the first axis.

In one form, a single piece defines each of the first, second, and third elongate legs.

In one form, the rotor has diametrically opposite first and second ears which extend axially with respect to the first axis, with the first ear having a forward end. The third axis is adjacent to the forward end of the first ear.

The forward end of the first ear may be the forwardmost part of the rotor.

In one form, the trigger has an elongate leg having a length extending substantially circumferentially with respect to the rotor for engaging the bail assembly and progressively camming the bail assembly from the retrieve position towards the cast position as the trigger moves from the normal position into the actuated position.

The length of the elongate leg on the trigger may be substantially parallel to the third axis.

In one form, the bail assembly has a bail wire and the pin arm has a cantilevered pin thereon. The pin is movable with the pin arm so that with the pin arm in the first position and the bail assembly in the cast position, the pin is situated in a first relationship with the bail wire to allow the line to pay off of a spool on the rotor by unwrapping around the first axis. With the pin arm in the second position and the bail assembly in the cast position, the pin is situated in a second relationship with the bail wire so that the pin prevents line from paying off of a spool on the rotor by unwrapping around the first axis.

In one form, the trigger has a forwardly projecting leg and there is a gripping portion applied to the forwardly projecting leg to facilitate engagement of the forwardly projecting leg by a user.

The forwardly projecting leg may be made from a first material, with the gripping portion being made from a second material that is different than the first material.

The second material may be softer than the first material and may be a polymer, or the like, having a durometer of 60–75 Shore A.

In one form, the forwardly projecting leg has a free end and the gripping portion surrounds the free end of the forwardly projecting leg.

In one form, there is a projection on one of the forwardly projecting leg and gripping portion and a recess for the projection on the other of the forwardly projecting leg and gripping portion that is complementary to the projection to interlock the forwardly projecting leg and gripping portion.

The recess may be defined by one or more elongate slits either partially through or fully through the forwardly projecting leg.

The trigger may exert a rearward force on the pin arm as the trigger moves from the normal position into the actuated position.

The invention is also directed to a rotor assembly for a fishing reel, which rotor assembly includes a rotor having a first rotational axis, with the rotor having forward and rear ends spaced axially relative to the first axis. The rotor assembly may further include a bail assembly that is repositionable relative to the rotor between cast and retrieve positions. The bail assembly has a first bail arm that is pivotable around a second axis relative to the rotor as the bail assembly moves between the cast and retrieve positions. The trigger is movable relative to the rotor around a third axis between normal and actuated positions. The bail assembly is movable from the retrieve position towards the cast position as an incident of the trigger moving from the normal position into the actuated position. The rotor has a first substantially flat surface facing radially outwardly relative to the first axis, with the first bail arm having a second substantially flat surface directly exposed to and facing the first surface, with the third axis being radially inside the first surface relative to the first axis.

DETAILED DESCRIPTION OF THE DRAWINGS

Figure 1:
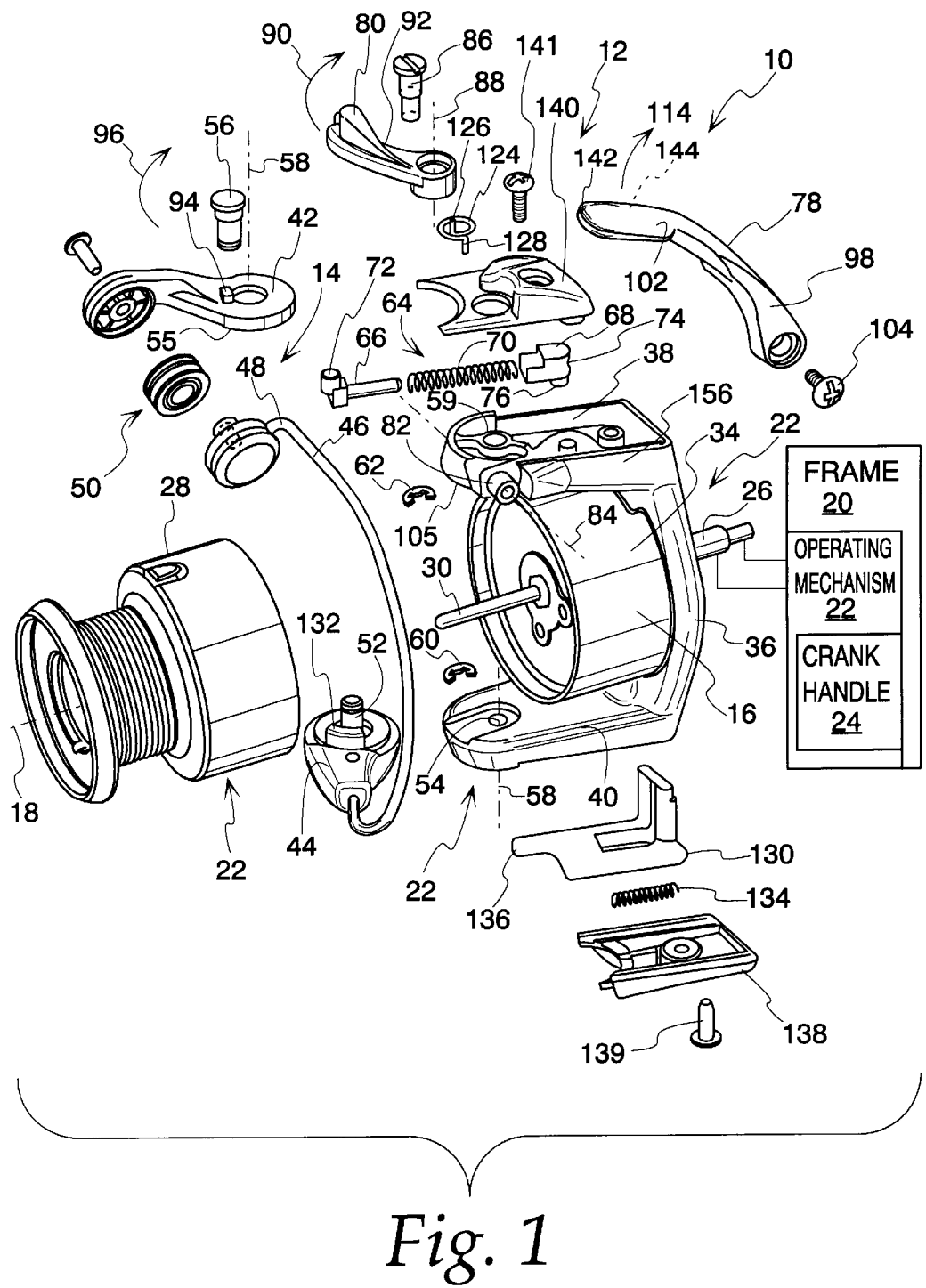
FIG. 1 is a partially schematic, exploded, perspective view of a fishing reel having a rotor assembly according to the present invention incorporated therein.

Referring initially to FIG. 1, a fishing reel is shown at 10 with a rotor assembly at 12, according to the present invention, incorporated therein.

Figure 2:
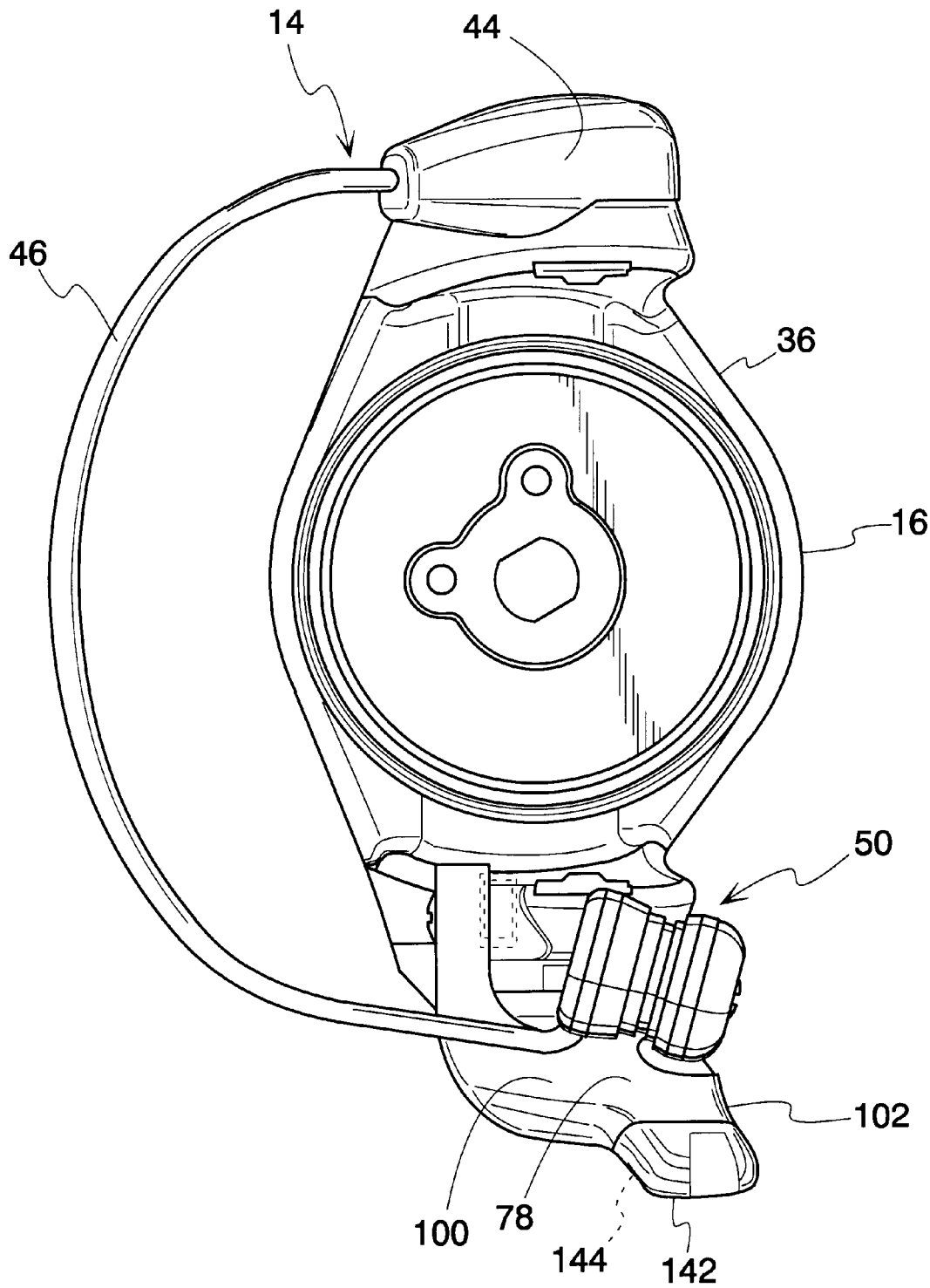
FIG. 2 is a front elevation view of the rotor assembly in FIG. 1 with a trigger on the rotor assembly in a normal position and a bail assembly thereon in a retrieve position.
Figure 3:
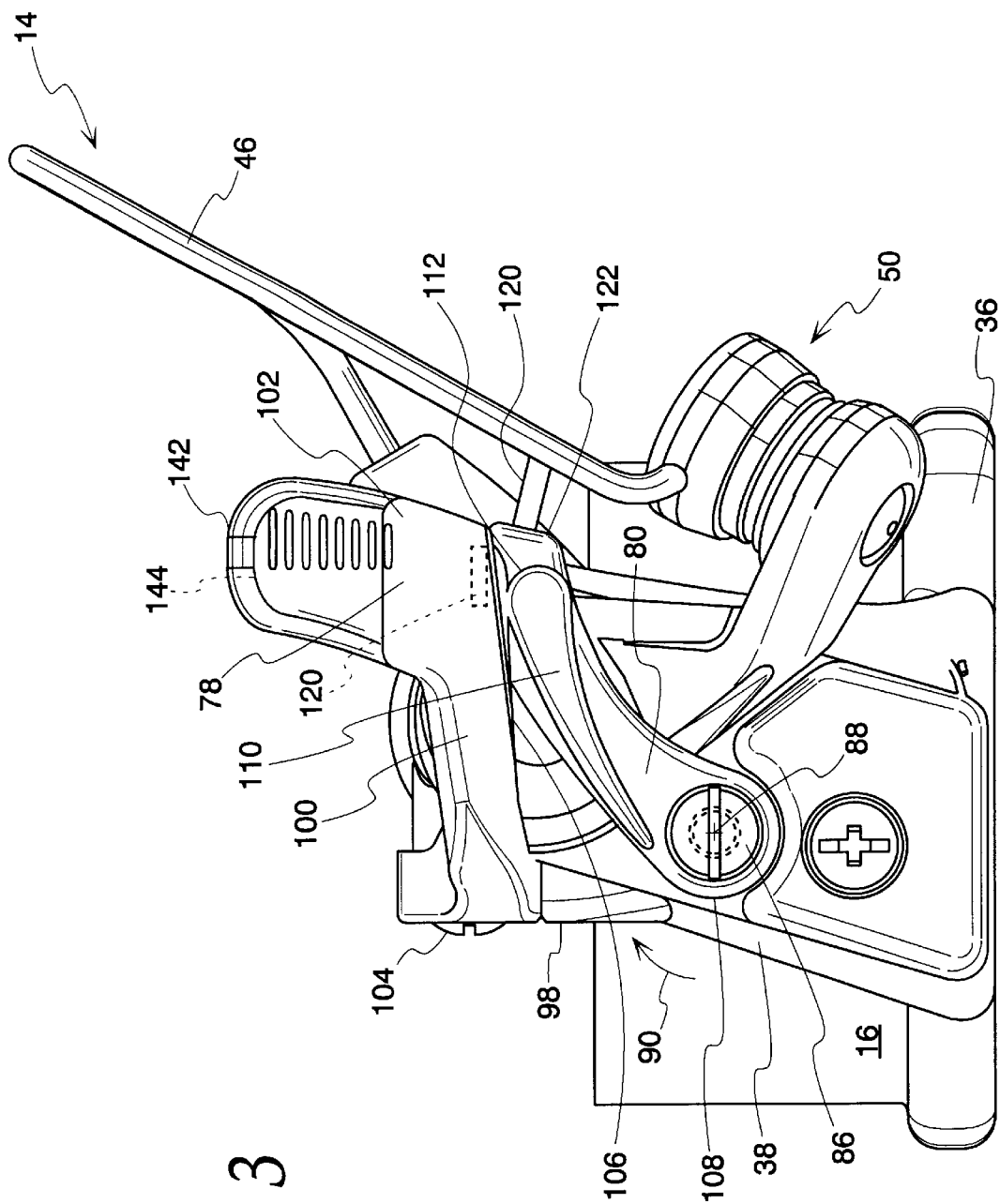
FIG. 3 is a side elevation view of the rotor assembly in FIGS. 1 and 2, with the trigger moved from the normal position of FIG. 2 into an actuated position and the bail assembly moved from the retrieve position of FIG. 2 into the cast position.
Figure 4:
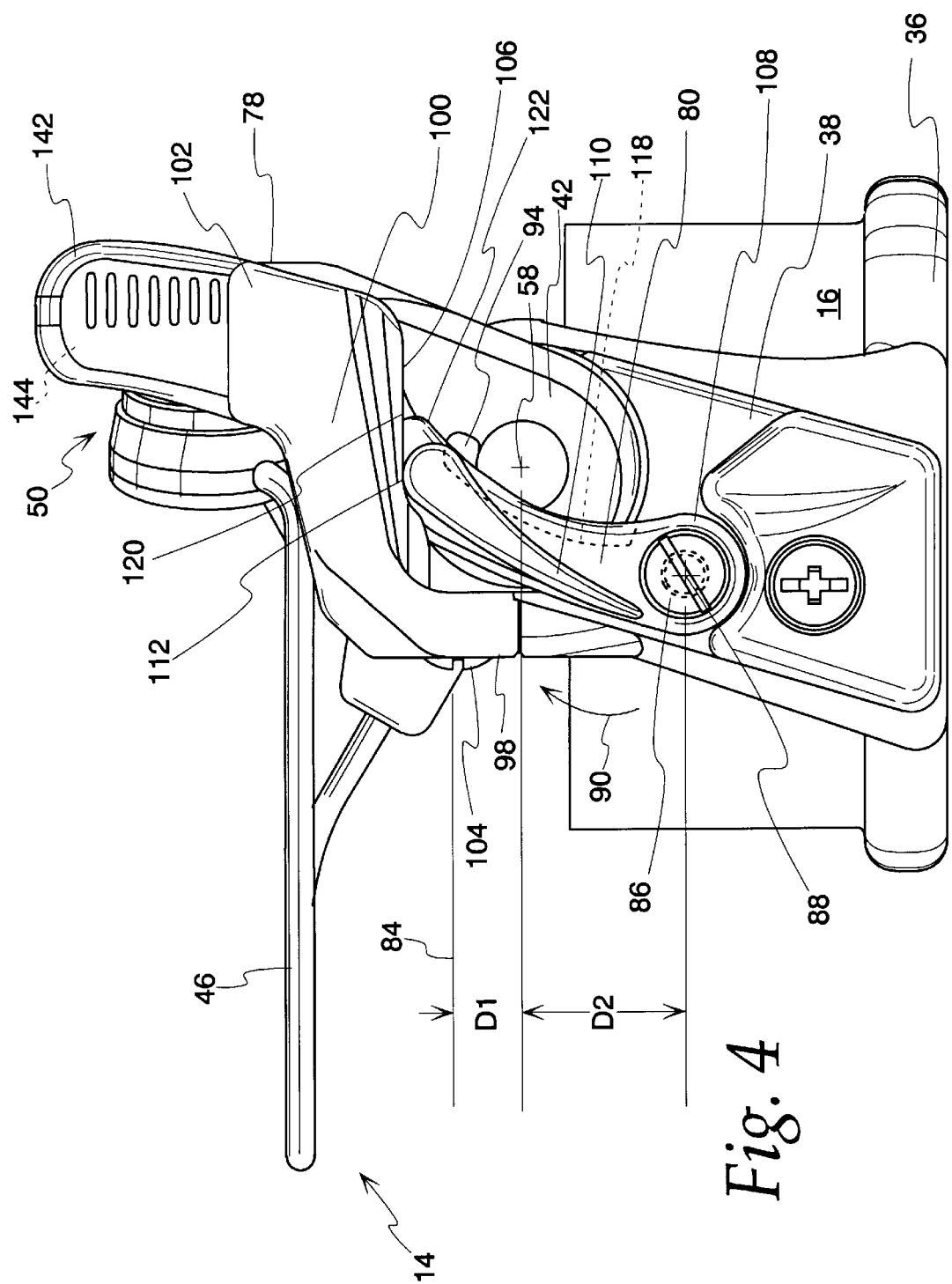
FIG. 4 is a view as in FIG. 3 with the trigger in the normal position and the bail assembly in the retrieve position.
Figure 5:
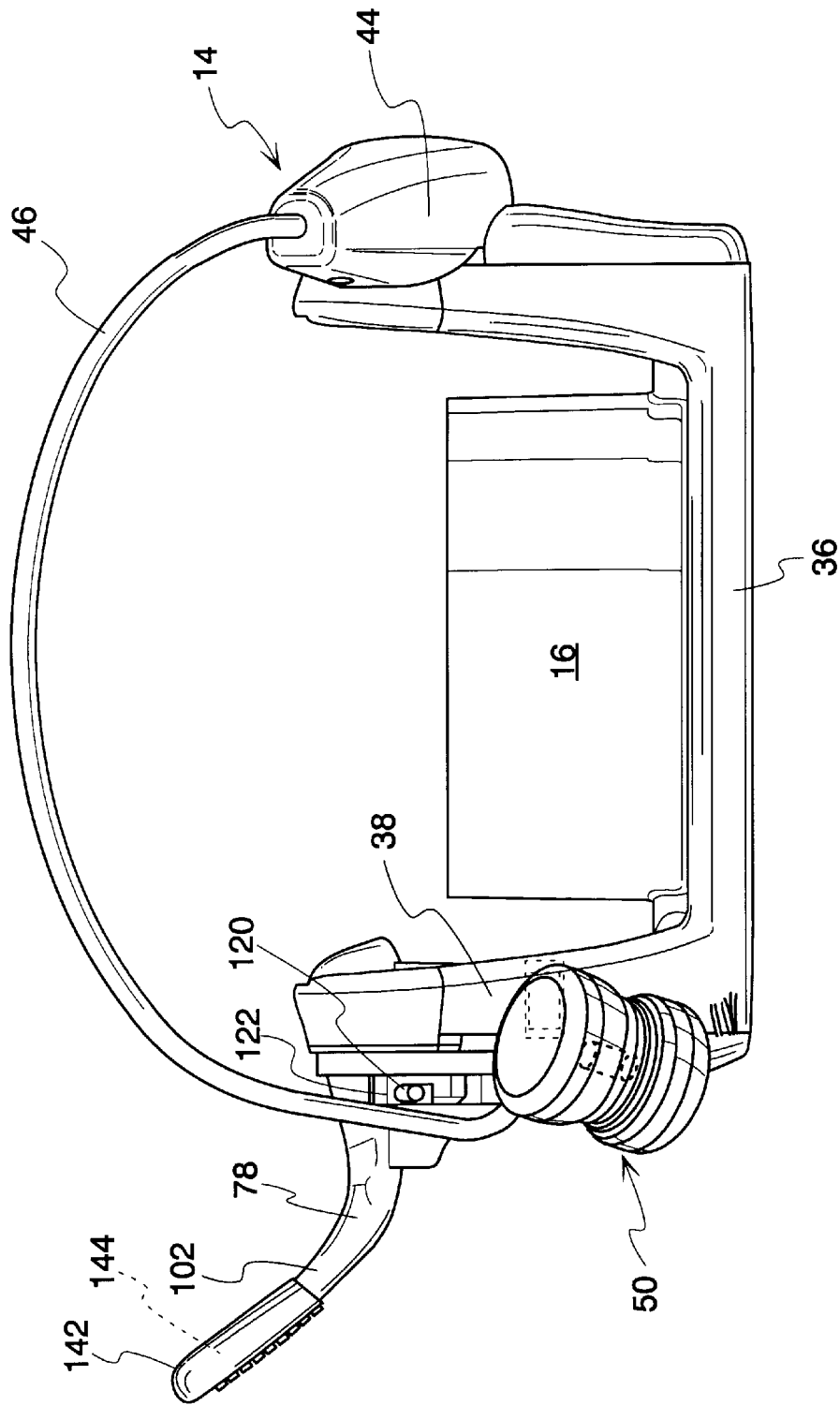
FIG. 5 is a view as in FIG. 3 with the rotor assembly in the state of FIG. 3 and rotated 90° around the central axis of the rotor assembly.

Initially, it should be understood that the invention is concerned principally with the actuation of a bail assembly at 14 which is mounted to a rotor 16 for pivoting movement between a cast position (see FIGS. 3 and 5) and a retrieve position (See FIGS. 2 and 4). There are a myriad of different mechanisms in existence which drive a rotor, such as the rotor 16, about a central axis 18, which extends in a fore and aft direction with respect to the reel 10. As but one example is that shown in U.S. Pat. No. 5,004,182, which is incorporated herein by reference. Since this mechanism is peripheral to the present invention, it will be described only generally herein.

In FIG. 1, a frame 20 provides a support for an operating mechanism 22, of which the rotor 16 forms a part. Through a crank handle 24, rotation is imparted to a shaft 26 to which the rotor 16 is attached. With the bail assembly 14 in the retrieve position, this rotation causes line to be wrapped around a line carrying spool 28.

The line carrying spool 28 is mounted upon a shaft 30 which extends through the rotor 16 and pinion gear, having a forward extension shown partially at 26, to an oscillating mechanism (not shown) that is part of the operating mechanism 22. Through the oscillating mechanism, the shaft 30, and line carrying spool 28 thereon, are reciprocated along the axis 18 to cause an even distribution of line upon the spool 28.

The details of the rotor assembly 12 will now be described. The rotor 16 consists of a cylindrical body 34 which blends into a wall 36 at the rear of the body 34. Diametrically opposite, first and second bail ears 38, 40 project forwardly from the wall 36 and generally parallel to the axis 18 so that a slight gap is maintained between the bail ears 38, 40 and the body 34.

The bail assembly 14 consists of first and second arms 42, 44 with a bail wire 46 connected therebetween. At one end 48 of the bail wire 46, a line roller assembly 50 is provided at the point of connection of the bail wire 46 with the bail arm 42 to function in conventional fashion.

The bail arm 44 has a mounting post 52 which extends radially inwardly through a bore 54 through the bail ear 40. The arm 42 has a substantially flat surface 55 facing radially inwardly with respect to the first axis 18 and is mounted to the other bail ear 38 through a pin 56 whereby the mounting post 52 and pin 56 guide pivoting of the bail assembly 14 as a unit around a second axis 58 relative to the rotor 20. The bail ear 38 has a substantially flat surface 59 directly exposed to and facing the bail arm surface 55. The surfaces 55, 59 are guided relative to each other around the second axis 58 as the bail assembly 14 repositions. The mounting post 52 and pin 56 are held in place by conventional clips 60, 62, respectively.

Through an overcenter bias mechanism at 64, the bail assembly 14 is pivotably driven into each of the cast and retrieve positions. The overcenter bias mechanism 64 has a conventional construction. Briefly, the overcenter bias mechanism 64 consists of a shaft element 66, a shaft receiver element 68, and a coil spring 70. The shaft element 66 has a post 72 which is pivotably mounted to the bail arm 42 at a location offset from the second axis 58. The shaft element 66 projects through the spring 70 and a bore 74 through the shaft receiver element 68. The shaft receiver element 68 has a post 76 which is directed into the ear 38 for rotation around an axis that is parallel to, and spaced from, the rotational axis of the post 72.

The posts 72, 76 are relatively positioned so that with the bail assembly 14 moved toward the retrieve position, the spring 70 acts between the shaft element 66 and shaft receiver element 68 so as to exert a torque on the bail assembly 14, driving the bail assembly 14 fully into the retrieve position. Once the bail assembly 14 is moved from the retrieve position towards the cast position to beyond an overcenter position, the spring 70 acts between the shaft element 66 and shaft receiver element 68 to drive the bail assembly 14 fully into the cast position.

Figure 6:
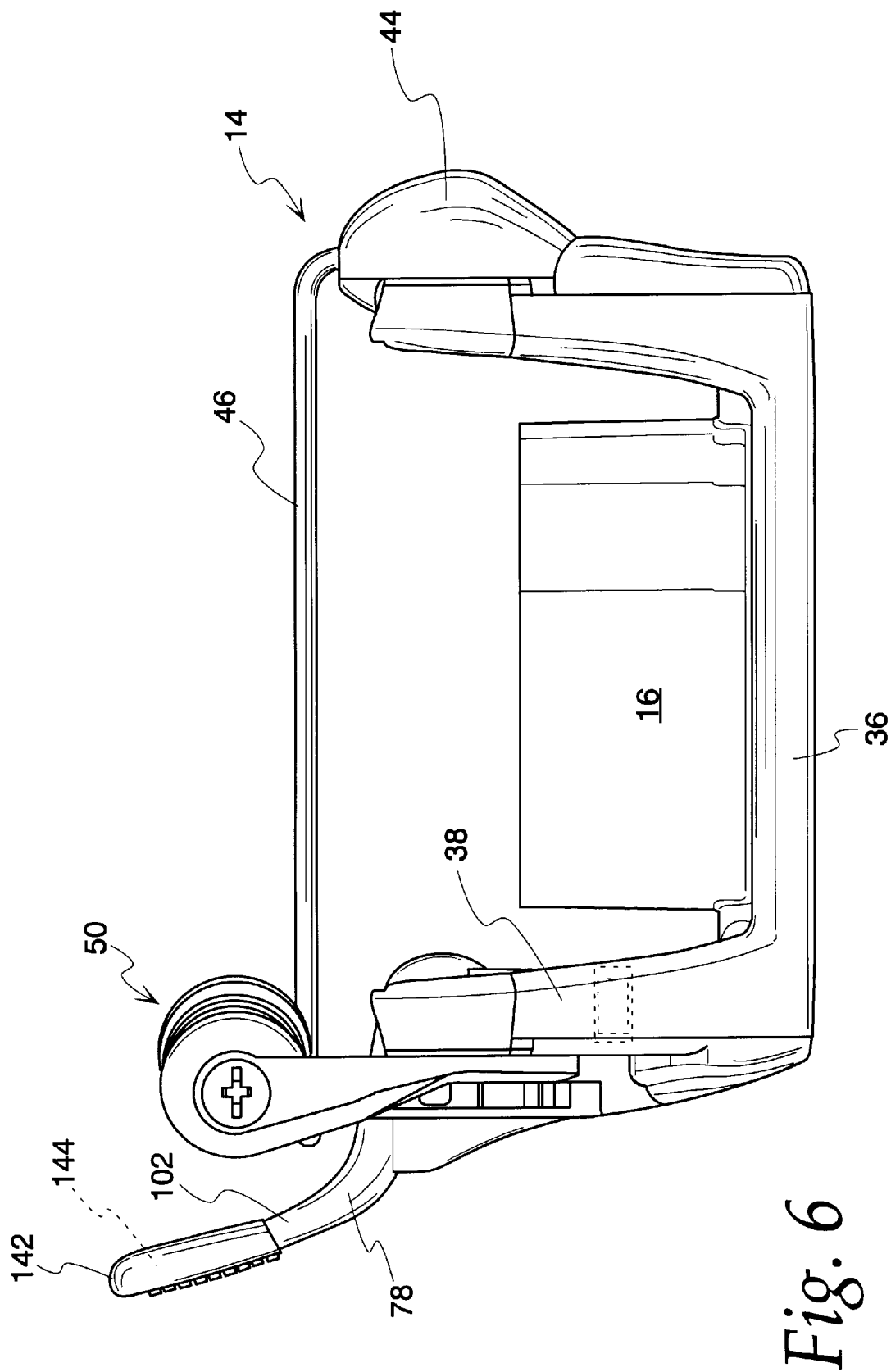
FIG. 6 is a view as in FIG. 5 with the rotor assembly in the state shown in FIG. 4.

The bail assembly 14 is repositionable from the retrieve position into the cast position by the cooperative arrangement of a trigger 78, a pin arm 80, and the bail arm 42. The trigger 78 is mounted to a post 82 on the bail ear 38 for pivoting movement around a third axis 84 between a normal position, shown in FIGS. 2, 4 and 6, and an actuated position, shown in FIGS. 3 and 5. The pin arm 80, with which the trigger 78 cooperates, is mounted to the ear 38 through a pin 86 for rotation about a fourth axis 88 relative to the rotor 20.

With the bail assembly 14 in the retrieve position, pivoting of the trigger 78 from the normal position into the actuated position causes the trigger 78 to contact the pin arm 80 and urge the pin arm 80 pivotably around the axis 88 in the direction of the arrow 90. In so doing, an edge 92 on the pin arm 80 bears against a post 94 on the arm 42. The post 94 is offset from the axis 58 so that the action of the edge 92 on the post 94 pivots the arm 42 in the direction of the arrow 96 around the axis 58, which moves the bail assembly 14 from the retrieve position to beyond the overcenter position between the cast and retrieve positions, whereupon the overcenter bias mechanism 64 drives the bail assembly 14 fully into the cast position.

Referring now also to FIGS. 2–7, the structure of the trigger 78, pin arm 80, and cooperation therebetween and with the bail assembly 14 are more clearly shown. The trigger 78 has a first elongate leg 98 with a length extending substantially radially with respect to the first axis 18. The trigger 78 has a second elongate leg 100 with a length extending substantially circumferentially relative to the rotor i.e. in a direction around the first axis 18 and generally parallel to the third axis 84. The trigger 78 has a forwardly projecting third elongate leg 102 with a length extending substantially parallel to the first axis 18. In the embodiment shown, there is a single piece that defines each of the first, second, and third elongate legs 98, 100, 102.

The first elongate leg 98 of the trigger 78 is attached to the post 82 on the bail ear 38 through a screw 104. The post 82 is located adjacent to the forward end 105 of the bail ear 38, which forward end 105 defines the forwardmost extension of the rotor 20. The second elongate leg 100 has a substantially straight edge 106 extending in a line that is substantially parallel to the third axis 84.

The pin arm 80 has a slightly curved shape with a thickened mounting portion 108 through which the pin 86 extends. The pin arm 80 has a ramp-shaped portion 110 which increases in radial projection relative to the first axis 18 moving forwardly of the pin arm 80 from the mounting portion 108. The ramp-shaped portion 110 of the pin arm 80 terminates in a curved forward edge 112 which is situated to abut to the straight edge 106 on the trigger 78. As the trigger 78 is pivoted in the direction of the arrow 114 (FIG. 1) from the normal position into the actuated position around the axis 84, the straight edge 106 on the trigger 78 moves rearwardly and bears against the curved edge 112 on the ramp-shaped portion 110 of the pin arm 80. Continued pivoting of the trigger 78 causes the straight edge 106 to progressively cam the pin arm 80 in the direction of the arrow 90 from a first position, as shown in FIG. 4, into a second position, as shown in FIG. 3.

The pin arm 80 has an undercut defining a curved, concave actuating edge 118 which engages the post 94 on the bail arm 42. The post 94 is offset relative to the axis 58 so that pivoting movement of the pin arm 80 from the first position into the second position drives the bail arm 42, through the post 94, from the retrieve position towards the cast position and beyond the overcenter position for the bail assembly 14, whereupon the overcenter bias mechanism 64 drives the bail assembly 14 fully into the cast position.

By reason of pivoting the trigger 78 on the bail ear 38 and configuring the trigger 78 as shown, the trigger 78 does not have to be stacked radially outwardly on the bail arm 42 relative to the first axis 18. Preferably, the third axis 84 is radially inside the surface 59 relative to the first axis 18. This permits a relatively low profile trigger 78 to be used.

The axis 84 is spaced forwardly from the axis 58 a first distance D1 (FIG. 4), with the axis 88 spaced rearwardly from the axis 58 a distance D2 that is at least twice the distance D1.

The relationship between the axes 18, 58, 84, 88 facilitates bail assembly actuation. The third axis 84 for the trigger 78 is situated forwardly of the bail arm axis 58 and pin arm axis 88. A positive torque can be produced on the bail assembly 14 through the trigger 78 without excessive force application on the trigger 78 by the user or movement of the trigger 78 through an unacceptably large pivot range.

The pin arm 80 has a pin 120 embedded therein to project in cantilever fashion from the free end 122 of the pin arm 80. The pin 120 moves as one piece with the pin arm 80. With the bail assembly 14 in the cast position and the pin arm 80 in the second position, the pin 120 assumes a first relationship with the bail wire 46 adjacent thereto (See phantom line location in FIG. 3) wherein line on the line carrying spool 28 is allowed to freely pay off in an unwrapping motion around the axis 18. By repositioning the pin arm 80 to the second position, shown in solid lines in FIG. 3, with the bail assembly 14 in the cast position, the pin 120 assumes a second relationship with the bail wire 46. In this state, line extending away from the line carrying spool 28 is wrapped around the pin 120 and prohibited from paying off of the spool 28 by an unwrapping motion around the axis 18.

With the bail assembly 14 in the retrieve position, the pin arm 80 is urged by a torsion spring 124 into the first position. The spring 124 has a circular shape with offset ends 126, 128 which project into the pin arm 80 and bail ear 38, respectively. The spring 124 is loaded so that the pin arm 80 is normally biased into the first position. The bias produced on the pin arm 80 also causes the curved edge 112 of the pin arm 80 to engage and pivot the trigger 78 into the normal position therefor.

The sequence of operation of the trigger 78, pin arm 80, and bail assembly 14 will now be described starting with the rotor assembly 12 in the FIG. 4 state, i.e. with the bail assembly 14 in the retrieve position and the trigger 78 in the normal position. By moving the trigger 78 in the direction of the arrow 114, the edge 106 on the trigger 78 cams the pin arm 80, exerting a rearward force on the curved edge 112 of the pin arm 80 to effect movement of the pin arm 80 towards the second position. As this occurs, the pin arm edge 118 drives the post 94 on the bail arm 42 to move the bail assembly 14 beyond the overcenter position therefor, whereupon the overcenter bias mechanism 64 drives the bail assembly 14 into the cast position. With the trigger 78 maintained in the actuated position, the pin arm 80 is maintained in the second position and in turn the pin 120 is maintained in the aforementioned second relationship with the bail wire 46. Line is thus prevented from paying off of the line carrying spool 28. The user, maintaining this state, thrusts the reel and rod in the desired direction and at the same time releases the trigger 78. With the bail assembly 14 in the cast position, and the trigger 78 released, the spring 124 drives the pin arm 80 back to the first position. As this occurs, the curved edge 112 on the pin arm 80 acts against the trigger edge 106 to urge the trigger 78 back to the normal position.

By then rotating the rotor 20 through the crank handle 24, the bail assembly 14 is caused to be automatically returned to the retrieve position. As seen in FIG. 1, this is accomplished through a trip link 130 which is driven rearwardly from a retracted position by a post 132 on the bail arm 44 as the bail assembly 14 moves from the retrieve position to the cast position. The trip link 130 is moved to an extended position against the force produced by a coil spring 134 loaded thereagainst. As the rotor 20 is rotated with the bail assembly 14 in the cast position, the trip link 130 in the extended position acts against a part of the frame 20 and is thereby cammed forwardly so that a forward edge 136 on the trip link 130 acts against the post 132 on the bail arm 44 to urge the bail assembly from the cast position into the retrieve position.

A removable cover 138 is provided on the bail ear 40 and held on the bail ear 40 through a fastener 139 to captively maintain the trip link 130 in place and to permit access thereto. A similar, removable cover 140 is provided on the bail ear 38 and held on the bail ear 38 by a fastener 141 to captively confine the overcenter bias mechanism 64.

To facilitate manipulation of the trigger 78, a gripping portion 142 is provided on the third elongate leg 102. The gripping portion 142 is defined by a material which is preferably different than the material which defines the third elongate leg 102. The third elongate leg 102 is made from a material that can withstand the operating forces exerted thereon and may be, for example, metal, plastic, or a composite. The gripping portion 142 is preferably made from a material that is comfortable to the touch. Preferably, the material making up the gripping portion 142 is softer than the material defining the third elongate leg 102. A polymer having a durometer of 60–75 Shore A is suitable for this purpose. The polymer may be pre-formed to be pressed onto a free end 144 of the leg 102 to surround the free end 144. Alternatively, the gripping portion 142 can be molded in place around the third elongate leg 102.

In the embodiment shown, the third elongate trigger leg 102 has a reduced cross-sectional area taken transversely to the length of the leg 102, whereby a forwardly facing, annular shoulder 145 is defined around the trigger leg 102. A reduced dimension portion at 146 results that supports the gripping portion 142. The portion 146 has by oppositely facing, substantially flat surfaces 147, 148 to which the polymer is directly applied. Rows of recesses/slits 149 are defined partially, and more preferably fully, through the reduced diameter trigger portion 146 between the surfaces 147, 148. Molding of the polymer over the trigger portion 146 causes the polymer to flow into the slits 149 to form projections in the slits 149 that lock the gripping portion 142 in place. Rearward shifting of the gripping portion is further resisted by the annular shoulder 145.

Figure 7:
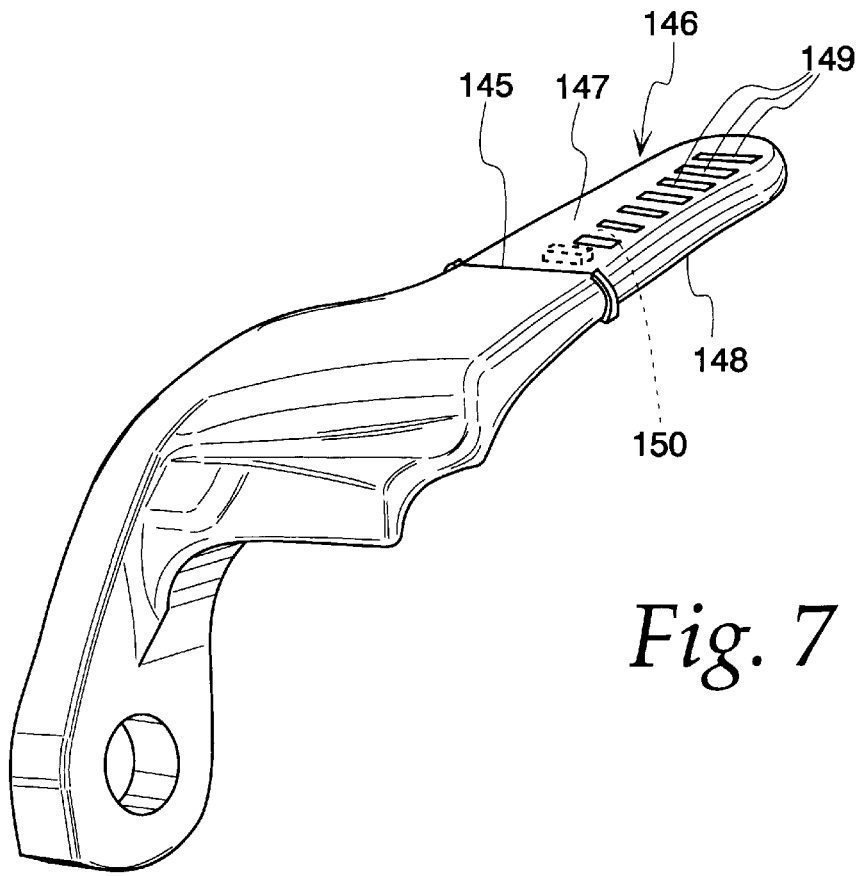
FIG. 7 is an enlarged, perspective view of the trigger with a gripping portion removed therefrom.

Alternatively, one or more projections 150, as shown in dotted lines in FIG. 7 can be used instead of the slits 149, or in conjunction with the slits 149. The polymer flows around the projection(s) 150, thereby causing an interlocking once the polymer cures and a recess complementary to the projection 150 is fixed therein.

The above arrangement provides good mechanical advantage. At the same time, this arrangement permits a relatively low profile trigger construction which allows a substantial finger space to be maintained between the rod upon which the reel 10 is mounted and the trigger 78. Further, with a relatively low profile trigger 78, centrifugal forces that require balancing may be limited.

Figure 8:
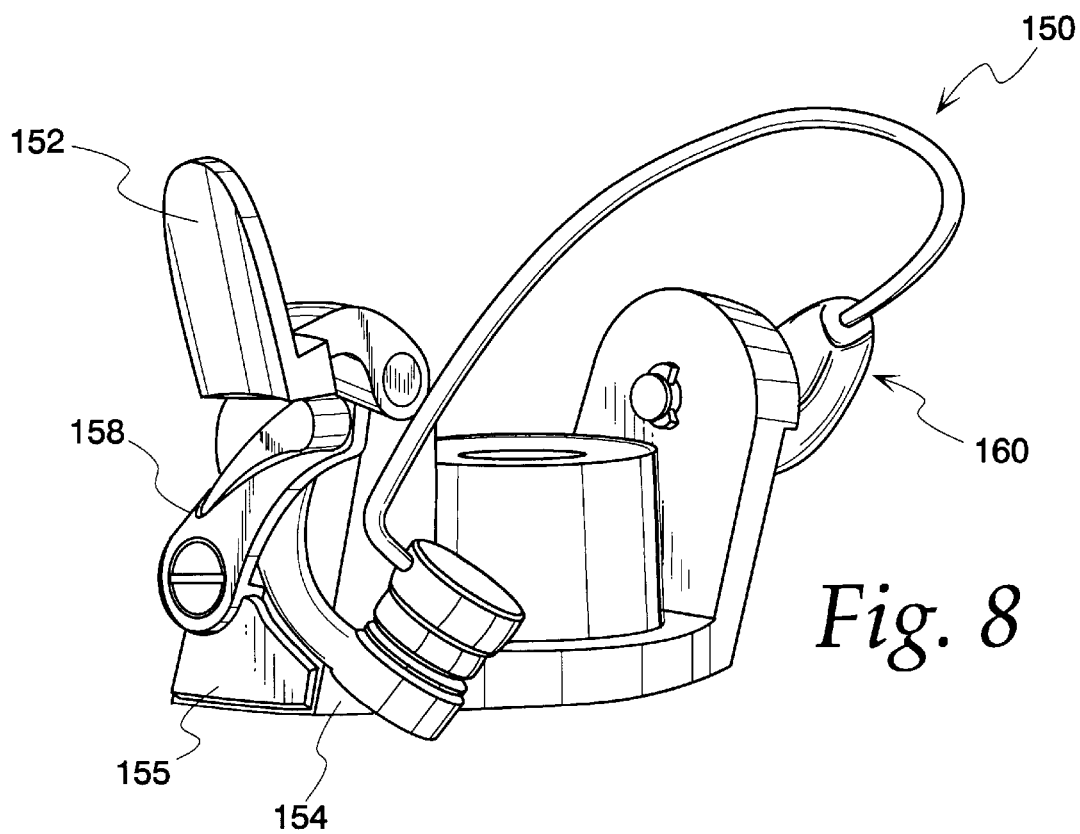
FIG. 8 is a perspective view of a modified form of rotor assembly with a trigger on the rotor assembly in an actuated position and a bail assembly on the rotor assembly in a cast position.
Figure 9:
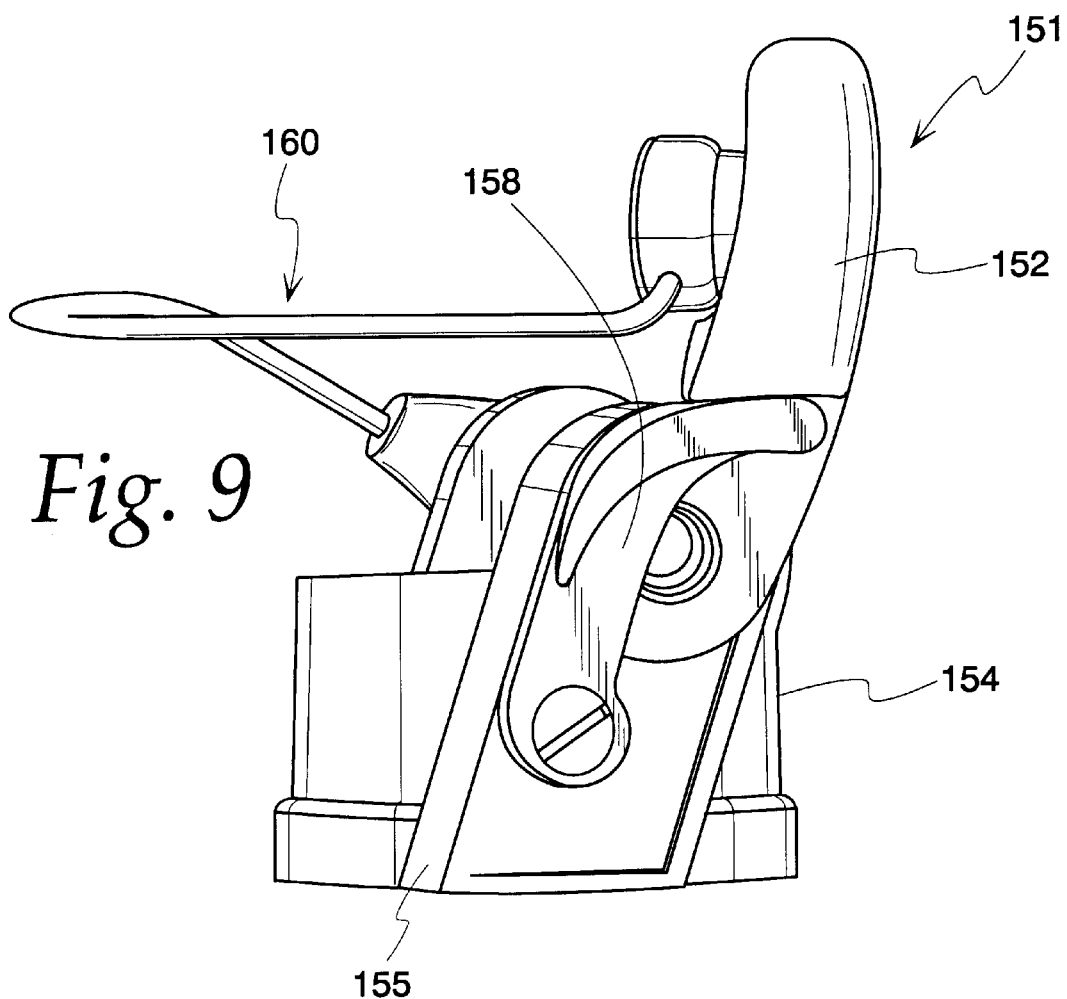
FIG. 9 is a perspective view of the rotor in FIG. 8 with the trigger in a normal position and the bail assembly in a retrieve position.

In FIGS. 8 and 9, a modified form of rotor assembly, according to the present invention, is shown at 150. The rotor assembly 150 differs from the rotor assembly 12 in that a trigger 152, corresponding to the trigger 78, is mounted at a circumferentially spacing edge 154 on a rotor ear 155 that is opposite to the corresponding edge 156 (FIG. 1) on the rotor ear 38. The trigger 152 operates and cooperates with a pin arm 158 and bail assembly 160, corresponding to the pin arm 80 and bail assembly 14, in the same manner as described with respect to the reel 10.

The foregoing disclosure of specific embodiments is intended to be illustrative of the broad concepts comprehended by the invention.

I claim:

1. A rotor assembly for a fishing reel, said rotor assembly comprising:

a rotor having a first rotational axis, the rotor having forward and rear ends spaced axially relative to the first axis;

a bail assembly that is repositionable relative to the rotor between cast and retrieve positions, the bail assembly comprising a first bail arm that is pivotable around a second axis relative to the rotor as the bail assembly moves between the cast and retrieve positions;

a trigger that is movable relative to the rotor around a third axis between normal and actuated positions, wherein the third axis is spaced forwardly of the second axis; and an arm that is movable relative to the rotor around a fourth axis between first and second positions, wherein movement of the trigger from the normal position to the actuated position causes the arm to move from the first position into the second position and movement of the arm from the first position into the second position causes the bail assembly to move from the retrieve position towards the cast position, wherein the fourth axis is spaced rearwardly from the second axis at all times as the arm moves between the first and second positions.

2. The rotor assembly for a fishing reel according to claim 1 wherein the rotor comprises a first substantially flat surface facing radially outwardly relative to the first axis, the first bail arm has a second substantially flat surface directly facing the first surface, and the third axis is radially inside the first surface relative to the first axis.

3. The rotor assembly for a fishing reel according to claim 1 wherein the third axis is substantially orthogonal to the second axis.

4. The rotor assembly for a fishing reel according to claim 1 wherein the arm comprises a pin arm.

5. The rotor assembly for a fishing reel according to claim 4 wherein the bail assembly comprises a bail wire, the pin arm has a cantilevered pin thereon, and the pin is movable with the pin arm so that with the pin arm in the first position and the bail assembly in the cast position, the pin is situated in a first relationship with the bail wire to allow the line to pay off of a spool on the rotor by unwrapping around the first axis and with the pin arm in the second position and the bail assembly in the cast position, the pin is situated in a second relationship with the bail wire so that the pin prevents line from paying off of a spool on the rotor by unwrapping around the first axis.

6. The rotor assembly for a fishing reel according to claim 4 wherein the trigger exerts a rearward force on the pin arm as the trigger moves from the normal position into the actuated position.

7. The rotor assembly for a fishing reel according to claim 1 wherein the fourth axis is substantially parallel to the second axis.

8. The rotor assembly for a fishing reel according to claim 7 wherein the fourth axis is fixed in relation to the second axis.

9. The rotor assembly for a fishing reel according to claim 1 wherein the trigger has a first elongate leg with a length extending substantially radially with respect to the first axis, a second elongate leg with a length extending substantially circumferentially relative to the rotor, and a third elongate leg with a length extending substantially parallel to the first axis.

10. The rotor assembly for a fishing reel according to claim 1 wherein there is a single piece that defines each of the first, second, and third elongate legs.

11. The rotor assembly for a fishing reel according to claim 1 wherein the rotor comprises diametrically opposite first and second ears which extend axially with respect to the first axis, the first ear has a forward end and the third axis is adjacent to the forward end of the first ear.

12. The rotor assembly for a fishing reel according to claim 11 wherein the forward end of the first ear is the forwardmost part of the rotor.

13. The rotor assembly for a fishing reel according to claim 1 wherein the trigger has an elongate leg having a length extending substantially circumferentially with respect to the rotor for engaging the bail assembly and progressively camming the bail assembly from the retrieve position towards the cast position as the trigger moves from the normal position into the actuated position.

14. The rotor assembly for a fishing reel according to claim 13 wherein the length of the elongate leg on the trigger is substantially parallel to the third axis.

15. The rotor assembly for a fishing reel according to claim 1 wherein the trigger has a forwardly projecting leg and there is a gripping portion applied to the forwardly projecting leg to facilitate engagement of the forwardly projecting leg by a user.

16. The rotor assembly for a fishing reel according to claim 15 wherein the forwardly projecting leg is made from a first material and the gripping portion is made from a second material that is different than the first material.

17. The rotor assembly for a fishing reel according to claim 16 wherein the second material is softer than the first material.

18. The rotor assembly for a fishing reel according to claim 17 wherein the second material is a polymer having a durometer of 60–75 Shore A.

19. The rotor assembly for a fishing reel according to claim 17 wherein the forwardly projecting leg has a free end and the gripping portion surrounds the free end of the forwardly projecting leg.

20. The rotor assembly for a fishing reel according to claim 17 wherein there is a projection on one of the forwardly projecting leg and gripping portion and a recess for the projection on the other of the forwardly projecting leg and gripping portion that is complementary to the projection to interlock the forwardly projecting leg and gripping portion.

21. The rotor assembly for a fishing reel according to claim 20 wherein the recess is defined by an elongate slit in the forwardly projecting leg.

22. The rotor assembly for a fishing reel according to claim 21 wherein the elongate slit extends fully through the forwardly projecting leg.

23. The rotor assembly for a fishing reel according to claim 20 wherein there are a plurality of recesses defined by a plurality of elongate slits in the forwardly projecting leg.

24. The rotor assembly for a fishing reel according to claim 1 wherein the third axis is spaced forwardly from the second axis a first distance, the fourth axis is spaced rearwardly of the second axis a second distance and the second distance is greater than the first distance.

25. The rotor assembly for a fishing reel according to claim 24 wherein the second distance is at least twice as great as the first distance.

26. The rotor assembly for a fishing reel according to claim 25 wherein the actuating surface is concave.

27. The rotor assembly for a fishing reel according to claim 1 wherein the bail assembly has a post and the pin has a curved actuating surface that engages the post to reposition the post and thereby move the bail assembly from the retrieve position towards the cast position as the arm moves from the first position towards the second position.

* * * * *

UNITED STATES PATENT AND TRADEMARK OFFICE
Certificate

Patent No. 6,056,221                                                                                             Patented: May 2, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Roy E. Stiner, Tulsa, OK; and Young J. Kang, Tulsa, OK.

Signed and Sealed this Fifteenth Day of April 2003.

DONALD P. WALSH
*Supervisory Patent Examiner*
Art Unit 3653